Aug. 1, 1961   R. MESPOULHES   2,994,785
STARTING METHOD AND APPARATUS FOR AIRCRAFT
EQUIPPED WITH ALTERNATORS
Filed March 27, 1959   4 Sheets-Sheet 4
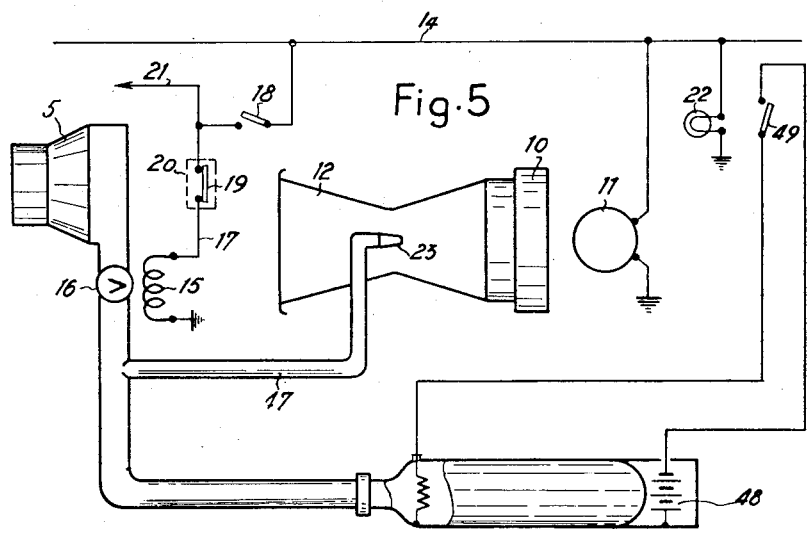
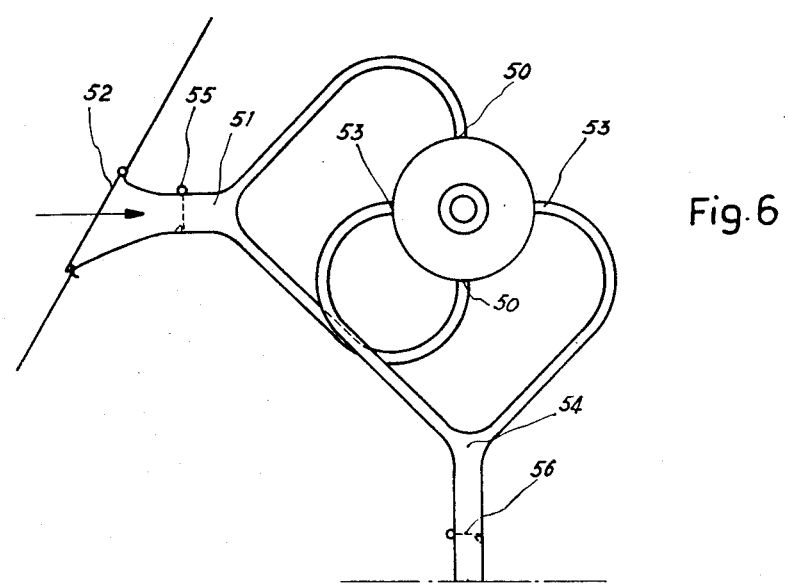

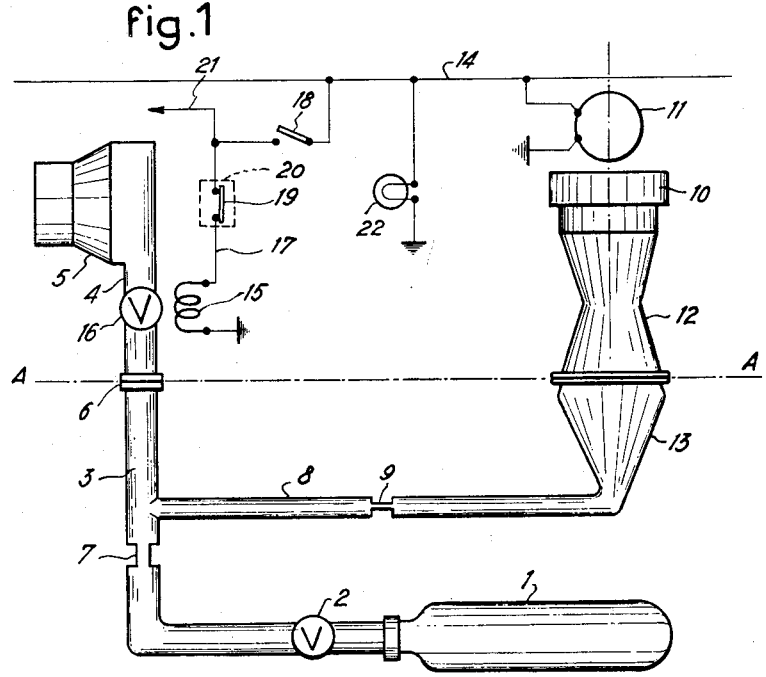

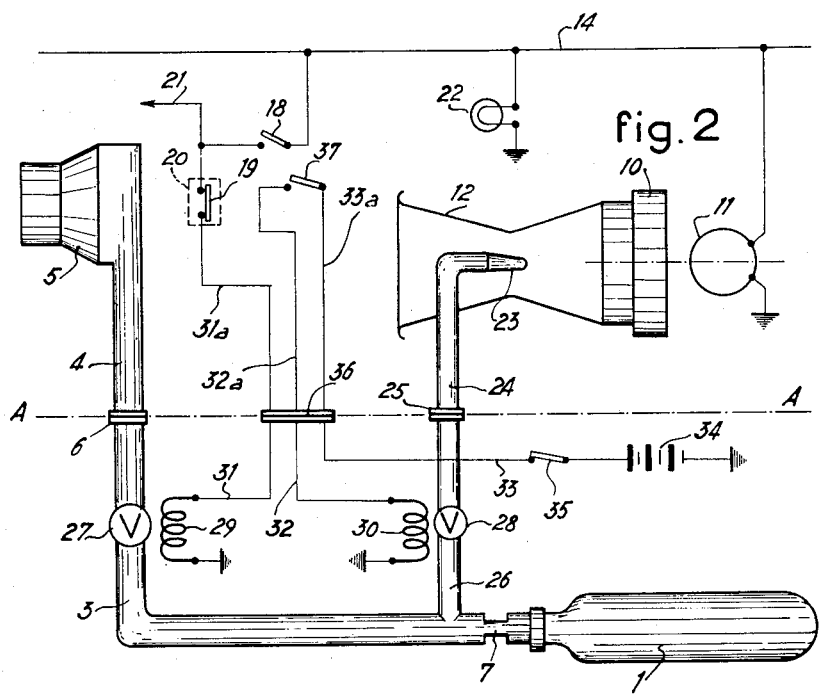

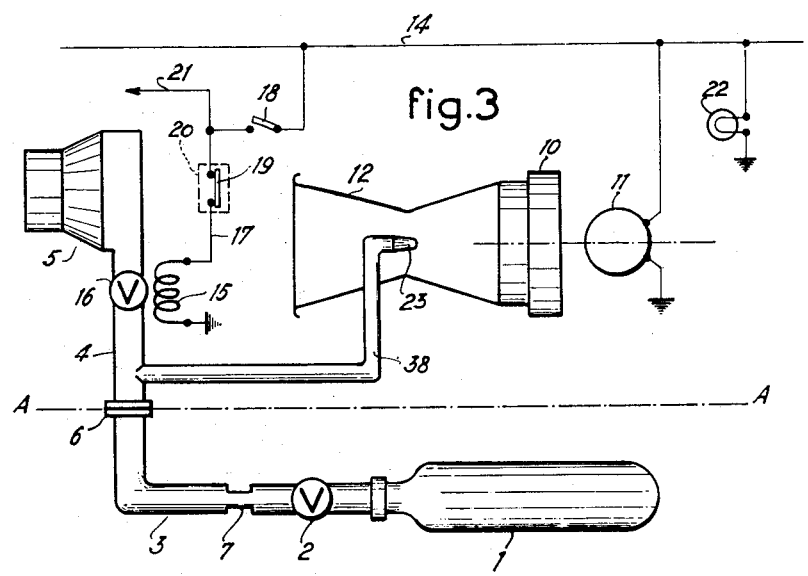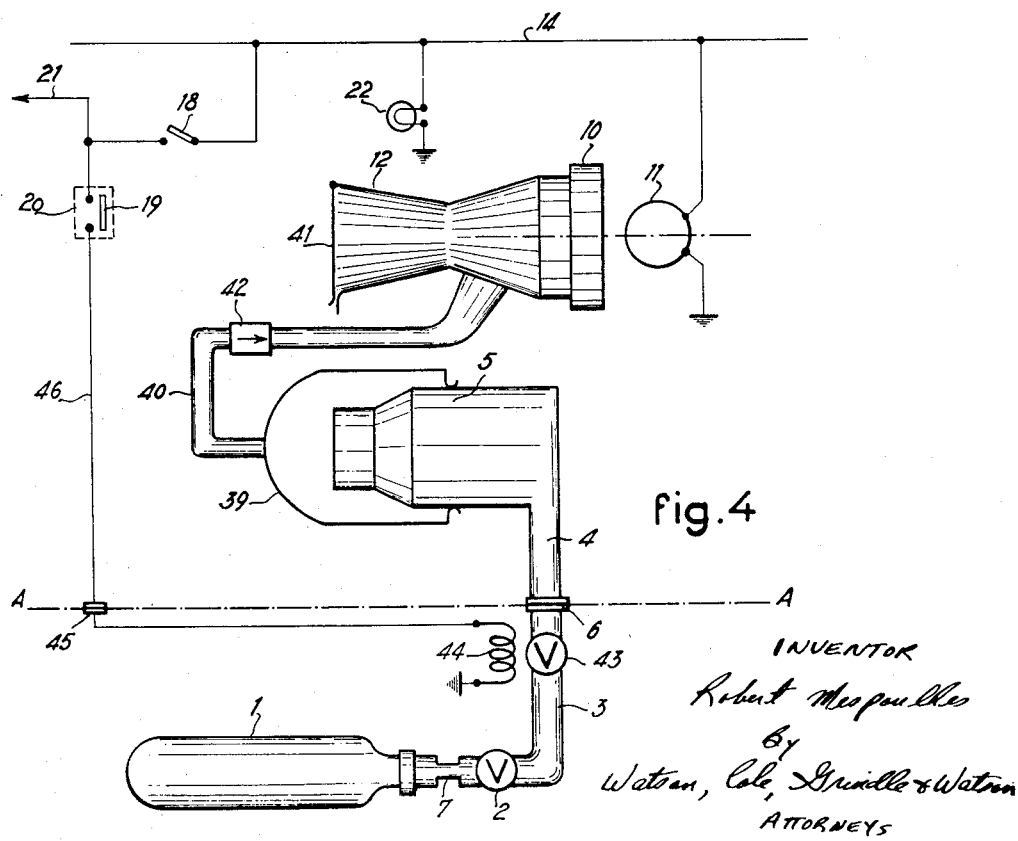

United States Patent Office 2,994,785
Patented Aug. 1, 1961

2,994,785
STARTING METHOD AND APPARATUS FOR AIRCRAFT EQUIPPED WITH ALTERNATORS
Robert Mespoulhes, Vitry-sur-Seine, France, assignor to Societe Nationale d'Etude et de Construction de Moteurs d'Aviation, Paris, France, a company of France
Filed Mar. 27, 1959, Ser. No. 802,363
Claims priority, application France Apr. 9, 1958
15 Claims. (Cl. 290—4)

It is known that the use of alternating current affords, as compared with direct current, considerable advantages with regard to weight and bulk both as regards the generating means and as regards the receiving means, which makes it appear most desirable to use alternating current in the field of aeronuatics. But, in spite of its disadvantages, up to the present time the use of direct current has been preferred since it has the property that it can be stored, which is not possible with alternating current. It is, in fact, indispensable to be able to have available, when the engine is stopped, a source of electrical energy necessary amongst other things for starting the propulsion unit of the aircraft. Whilst the accumulators on board the aircraft are capable of supplying the requisite electrical energy in the form of direct current in this situation, alternators, not being driven, cannot produce electrical energy.

However, this important property of direct current disappears at very high speeds of flight (Mach 2 or above) owing to kinetic heating, since the present known kinds of accumulators cannot withstand the temperatures which may be reached. Therefore, aircraft engineers have once more been faced with the problem, now more imperative than before, of using alternators on board fast aircraft.

Up to the present time, the absence of electrical energy available on board when the aircraft is stopped has been dealt with by using external current sources, the ground service equipment being used for this purpose. However, this solution is not a very happy one.

In fact, during a war it would be imperative to have aircraft dispersed far away from centres which might constitute objectives of enemy attack. Even the weak electrical power required, even if only for the ignition of the reaction propulsion units, requires long electrical lines or extremely bulky and expensive mobile generating sets. Getting a formation into the air in cases where the aircraft are dispersed several hundred metres from one another and from the runway would entail almost insurmountable difficulties for the ground facilities from the logistics point of view.

The object of the present invention is to avoid having recourse to external sources of electrical current, by using a very small part of the energy necessary for starting the propulsion unit and transforming it into electrical energy by means of the equipment already existing in the aircraft. Thus, from the logistics point of view, there need only be provided the ground equipment necessary for starting the propulsion unit, without having to bother with the electrical equipment for the ignition of the said unit.

According to the present invention, the ground starting of an alternator on board the aircraft in conjunction with the starting of the propulsion unit is effected pneumatically by feeding a turbine coupled to the alternator with the same driving fluid used for starting the said propulsion unit. According to one form of embodiment of this method, part of the compressed air or other fluid under pressure supplied by a source on the ground and intended for starting the propulsion unit is taken for the purpose of supplying the turbine of the alternator. In a modified form of embodiment, the driving fluid which has been used for starting the propulsion unit is recovered and its expansion is completed in the turbine of the alternator.

The present invention also covers any apparatus and any installation whereby the starting method can be carried into effect, thus avoiding resorting to electrical sources in the servicing equipment.

The description which will now be given with reference to the accompanying drawings, given by way of non-limitative example, will make it easy to understand the various features of the invention and the manner of carrying them into effect.

FIGURE 1 is a diagrammatic view of a starting apparatus according to the present invention, wherein part of the compressed air intended for starting the propulsion unit is taken off to feed the turbine.

FIGURES 2 and 3 illustrate modified forms of embodiment intended to reduce the amount of driving fluid taken off.

FIGURE 4 is a diagrammatic view of a further modified form of embodiment wherein use is made of the compressed air which has been used for starting the propulsion unit.

FIGURE 5 illustrates a modified form of embodiment wherein starting is brought about by the combustion of a cartridge.

FIGURE 6 shows a mode of feeding the turbine of the turbo-alternator in a case where the turbine is of the centripetal or tangential type, either by the fluid used for starting or by the dynamic pressure during flight.

The chain-dotted line A—A in the drawing indicates diagrammatically a part of the external surface of the aircraft, the elements situated above this line belonging to the equipment on board the aircraft, whereas those situated below this line constitute ground equipment.

The form of embodiment illustrated in FIGURE 1 comprises a bottle of compressed air 1, or other compressed-air supply means, provided with a manually controlled cock 2 and connected by a duct 3, 4 to the air turbine of the starter 5 of the propulsion unit of the aircraft (not shown), for example a turbo-jet engine whose shaft is coupled to the starter in known manner. The external duct 3, which can be flexible, is connected to the internal duct 4 by a connection 6, for example of the self-sealing type, which is normally closed and which opens when the end piece of the external duct 3 is engaged thereon. The pressure of the compressed air supplied by the source 1 is reduced and adapted to the operation of the starter 5 by means of a reducing valve 7.

According to the invention, a portion of this compressed air is taken off through a flexible branch pipe 8 from the duct 3 and is directed through a complementary pressure-reducer 9 towards the air turbine 10 coupled to the alternator 11, the connector of the branch pipe 8 to the intake sleeve 12 of the turbine being effected by means of a sealing-tight hood 13.

The alternator 11 delivers through a line 14 to which is connected the coil 15 of an electromagnetic valve 16 arranged in the intake duct 4 and closed in the position of rest. In the energizing circuit 17 of this electromagnetic valve there are inserted a switch 18 operated by the pilot and a contact blade 19 of a revolution meter 20 associated with the shaft of the turbo-jet engine and automatically effecting the opening of the contact 19 after a pre-determined number of revolutions of the said shaft. Downstream of the switch 18 and upstream of the contact 19 there is connected the ignition circuit 21 for the propulsion unit. Finally, there is also connected to the line 14 a signal lamp 22 which lights up as soon as a certain voltage is reached, this voltage being that which is necessary for the operation of the electromagnetic valve 15, 16.

The starting apparatus which has just been described operates in the following manner:

The opening of the cock 2 of the bottle 1 supplies air to the air turbine 10 connected to the alternator 11, the compressed air pressure being lowered firstly by the pressure reducing valve 7 and secondly by the pressure reducing valve 9 (this additional expansion being recommended since the turbine 10 operates at a lower expansion ratio than that of the starter).

The alternator 11 then supplies voltage to the line 14. The signal lamp 22 lights up as soon as the voltage is sufficient. The pilot then closes the switch 18 controlling the ignition circuit 21 of the reaction propulsion unit and the energizing circuit 17 of the electromagnetic valve 15, 16. The latter opens, permitting the supply of compressed air to the starter 5 which drives the shaft of the reaction propulsion unit, the rotation of which is transmitted in any known appropriate manner to the revolution meter 20. After a given number of revolutions of the shaft, the contact 19 opens, interrupting the supply of current to the electromagnetic valve 15, 16.

The cock 2 can then be closed and the duct 3 and hood 13 disconnected.

It should be noted that during flight, if the engine is stopped the alternator 11 will be driven by the air turbine 10 whose intake sleeve 12 will be appropriately orientated to receive the slipstream and will therefore act as an emergency source of electrical current.

FIGURE 2 illustrates a modified form of embodiment with the object of, on the one hnad, reducing the amount of air which has to be taken off for starting the turbo-alternator group and, on the other hand, concentrating all the controls in the cockpit.

The intake sleeve 12, in this case, comprises in the vicinity of its throat an injection nozzle 23 forming part of an ejector system in conjunction with the wall of the said sleeve. This injection nozzle is supplied through a pipe 24 situated inside the fuselage and connected, for example, by means of a self-sealing connection 25, to a flexible branch pipe 26 connected to the duct 3 at the outlet of the compressed air source 1, downstream of the pressure-reducer 7.

Arranged on the external ducts 3 and 26 are the electromagnetic valves 27 and 28 whose coils 29 and 30 are inserted in circuits 31 and 32. A third circuit 33 comprises a battery 34 and a disconnecting switch 35. The external circuits 31, 32 and 33 are connected by a connection 36 to three internal circuits 31a, 32a and 33a. The circuits 32a and 33a can be closed by a switch 37, whereas the circuit 31a is connected to the line 14 by means of the temporary contact 19 and the switch 18.

When he is ready to start, the pilot closes the switch 37, thus connecting the coil 30 of the electromagnetic valve 28 to the battery 34. This valve opens, sending air from the bottle 1 into the injection nozzle 23. The jet of air produced by the nozzle 23 induces, in the intake sleeve 12 of the air turbine 10, a flow much greater than that of the stream of inducing air and sufficient to drive the said turbine. The alternator 11 then supplies current to the line 14 and the lamp 22 lights up. Then, as in the preceding case, the pilot closes the switch 18 which allows current to pass through the coil 29 of the electromagnetic valve 27 arranged on the duct 3. The reaction unit is thus driven by the starter 5, whereas its ignition device is supplied with current through the circuit 21.

As soon as the shaft of the reaction unit has carried out a pre-determined number of revolutions, the contact 19 opens, interrupting the energisation of the coil 29 of the electromagnetic valve 27 and the latter stops the supply of compressed air to the starter 5. The pilot then cuts out the circuit energizing the coil 30 of the electromagnetic valve 28 by opening the switch 37 and the outer ducts 3 and 26 and also the connection 36 can be disconnected.

It is to be noted that the electrical energy required for supplying the coil 30 is very slight, and therefore the bulk and weight of the battery 34 are very small and it is possible to fix the said battery near the source of compressed air 1.

It will also be noted that there is no additional pressure-reducer 9 as in FIGURE 1; in fact, the injection nozzle 23 is to be supplied at a higher pressure than the pressure required for the intake sleeve in the preceding case since it must be given the ejector effect mentioned hereinbefore. The flexible pipe 26 supplying air to the injection nozzle 23 is therefore smaller in diameter and its sealing-tight connection at 25 is greatly facilitated.

The disconnecting switch 35 enables a ground staff mechanic to switch off everything in the case of any mistake in working or in the event of an accident.

It would be possible, of course, to replace the flexible external pipe 26 supplying the injection nozzle 23 by an internal rigid or non-rigid pipe connected to the supply duct 4 of the starter.

FIGURE 3 shows an embodiment of this kind, the injection nozzle 23 being supplied by an internal branch pipe 38. In this case it is recommended, for considerations of installed weight, to place the turbo-alternator as near as possible to the internal duct 4 which admits air to the starter.

In this latter form of embodiment, where the system of valves is similar to that of FIGURE 1, it is sufficient to have a single air connection 6.

FIG. 4 shows a modified form of embodiment which can be applied, more particularly, to a starter installation for a reaction propulsion unit wherein the exhaust air from the starter is not re-aspirated by the reaction propulsion unit but issues through a pipe provided for this purpose, for example, externally of the admission casing of the reaction propulsion unit.

Thus, in this FIG. 4, the air issuing from the starter 5 is collected in a chamber 39 and conveyed through a pipe 40 towards the intake sleeve 12 of the turbo-alternator. In this case, it will of course be preferable to block the inlet end of the sleeve, for example, by a shutter 41 when starting on the ground, this shutter 41 only being opened for emergency operation of the turbo-alternator, that is to say when flying with the engines inoperative. It will also be advantageous to provide in the pipe 40 a non-return valve 42 preventing the return flow of air through this pipe when the turbo-alternator is used in altitude.

In this modified form of embodiment, the external pipe 3 comprises an electromagnetic valve 43 whose coil 44 is connected by way of a connection 45 to the internal circuit 46 connected to the line 14 and comprising the blade 19 of the meter 20 and the manually controlled switch 18.

Contrary to the preceding examples, the contact 19 is here normally open and only closes when the propulsion unit has carried out a pre-determined number of revolutions. Moreover, the electromagnetic valve 43 is normally open and closes only when the coil 44 is energised.

The starting operation commences by opening the cock 2. The electromagnetic valve 43 being open, the starter 5 is fed with compressed air and rotates the shaft of the reaction propulsion unit. The compressed air having undergone a partial expansion in the turbine of the starter 5, reaches the turbine 10 which in its turn is driven and the alternator 11 supplies current through the line 14. As soon as the signal lamp 22 lights up, the pilot closes the switch 18 controlling the ignition circuit of the reaction propulsion unit. When the shaft of the latter has carried out a certain number of revolutions, the contact 19 closes and, the coil 44 being then energised, the electromagnetic valve 43 interrupts the supply of air to the starter 5. The cock 2 can then be closed and the connections 6 and 45 disconnected.

In cases where the reaction propulsion unit is started by means of an explosive provided in cartridge form (FIG. 5), the same principle can be put into effect, some of the burned gases being branched off towards the turbo-alternator through a pipe 47.

It should then be noted that the ground service installation can be practically dispensed with, and starting can be carried out in a fully independent manner despite the exclusive use of alternating current. Even in the case where ignition of the powder cartridges is controlled electrically, starting can be carried out completely independently provided that the cartridge comprises a battery 48 of small dimensions in order to ensure the ignition of the cartridge from a button 49 in the cockpit.

If it is desired not to complicate the cartridges, independent starting will not be, theoretically, realised but the electrical equipment necessary will be limited to a simple pocket battery which can quite easily be carried by the aircraft mechanic. The starting of the aircraft will be carried out in a practical manner from the logistics point of view at least.

The starting cartridge installation can also be arranged under conditions such as are shown in FIG. 4. The turbo-alternator is then supplied with the burned gases issuing from the starter instead of being supplied by taking off some of the gases of the cartridge upstream of the starter. In this latter case, as in FIG. 4, the turbine 10 of the emergency alternator serves as a second expansion stage. The pneumatic energy necessary for starting the reaction propulsion unit is, moreover, only slightly increased by reason of the expansion effected in the turbine 10 which is very low, as explained hereinbefore, and in any case negligible relatively to the expansion effected in the starter turbine. By way of example, when the latter requires, for starting with compressed air, an intake pressure of the order of 4 to 7 kg./cm.$^2$, in order to operate the air turbine 10 of the alternator it is sufficient to have a pressure of about 70 g./cm.$^2$ corresponding approximately to the dynamic pressure which is exerted by the slip stream when the turbo-alternator is being used as an emergency device, the propulsion unit being inoperative.

According to one particular form of embodiment, it would be advantageous to use for driving the emergency alternator a turbine of the "tangential" (Pelton, for example) type or centripetal type. This turbine will be supplied with air in the following ways, as appropriate (FIG. 6):

(a) By a set of air injection nozzles 50 arranged peripherally and connected for example by an air collector 51 to the dynamic air intake 52 used for driving the said turbine in cases where the reaction propulsion unit stops during flight;

(b) By a second set of injection nozzles 53 preferably debouching in an alternate arrangement with the first-mentioned set of nozzles and connected, for example, by a collector 54 either to the starting air intake as provided in FIGS. 1, 2, 3 and 5 or to the outlet of the starter turbine as provided in FIG. 4.

Generally speaking, and more particularly in cases where either a tangential or centripetal turbine is used, the supply pipes can comprise, upstream or their junction point (or upstream of the collectors) a valve which is, for example, of the throttle-valve kind. The position of these valves will be as follows in the various cases:

Normal flight: both throttle valves 55 and 56 closed;
Aircraft in flight with reaction propulsion unit inoperative: throttle valve 55 open, throttle valve 56 closed;
Starting on the ground: throttle valve 55 close, throttle valve 56 opened.

According to one feature of this solution, the throttle valves can at the same time form non-return valves so that the supply duct to the turbine at the time of starting is closed when the turbine has to operate during flight when the reaction propulsion unit is inoperative, and vice versa, thus permitting automatic reliable operation without burdening the pilot (or the mechanic) with additional operations.

It will be apparent that the invention is in no way limited to the forms of embodiment which have just been described, and that, without departing from the scope of the present invention, it would be possible to use any equivalent technical means. More particularly, it will be apparent that the revolution detector 20 could be replaced by a timing relay or any other appropriate device. Similarly, in order to simplify the drawings the circuits illustrated are single-phase but the invention is equally applicable to installations using polyphase circuits.

I claim:

1. In the starting of an aircraft having a propulsion-engine starter motor of the gas-actuated type and an alternator coupled to a gas-actuated turbine, the process which comprises the step of supplying both said motor and turbine with pressure gas originating from a same source, whereby said power plant and said alternator are started in combination.

2. Process as claimed in claim 1, wherein a fraction of the pressure gas flow fed to the motor is tapped and supplied to the turbine.

3. Process as claimed in claim 1, wherein the pressure gas flow is fed to the motor, collected after partial expansion therein, and then fed to the turbine wherein it completes its expansion.

4. A device for starting an alternator on board an aircraft having a propulsion engine starter motor of the gas-actuated type, comprising a gas-actuated turbine coupled to said alternator for driving the same, and a common source of pressure gas for supplying both said motor and said turbine.

5. Device as claimed in claim 4, comprising piping means between the source of pressure gas and the motor, and a branching duct extending between a point of said piping means and the turbine, whereby the latter is fed with pressure gas tapped from said piping means.

6. Device as claimed in claim 5, wherein the source of pressure gas together with at least a portion of the piping means and branching duct, are located outside the aircraft and belong to ground equipment.

7. Device as claimed in claim 4, comprising an air-intake casing for the turbine, and a nozzle inside said casing and fed with pressure gas from the source to induce, by ejector effect, an air flow through said casing.

8. Device as claimed in claim 4, comprising piping means between the source of pressure gas and the intake end of the motor, gas-collecting means at the exhaust end of said motor, and a duct between said gas-collecting means and the turbine.

9. Device as claimed in claim 8, comprising further a check valve in the duct to prevent back-flow therethrough from the turbine towards the gas-collecting means.

10. Device as claimed in claim 4, comprising piping means between the source of pressure gas and the motor, an electrically-operated valve in said piping means, a coil controlling said valve, an energizing circuit connected to said coil, and a control switch in said circuit.

11. Device as claimed in claim 10, comprising further a temporary electric contact in the energizing circuit, in series with the coil.

12. Device as claimed in claim 11, wherein the control switch is located upstream of the temporary contact, and the propulsion engine has an ignition circuit connected to a point of the coil energizing circuit between said switch and said temporary contact.

13. Device as claimed in claim 4, wherein the pressure gas source is a bottle of compressed air.

14. Device as claimed in claim 4, wherein the pressure gas source is a powder cartridge adapted to generate combustion gases.

15. Device as claimed in claim 14, comprising a powder igniter system which includes a battery incorporated in the cartridge and an external igniter switch.

References Cited in the file of this patent

UNITED STATES PATENTS 1,959,373     Law et al. _____ May 22, 1934